United States Patent
Schulz et al.

(10) Patent No.: US 7,949,065 B2
(45) Date of Patent: May 24, 2011

(54) RADIO TRANSMISSION WITH VARIABLE LENGTH OF GUARD INTERVAL

(75) Inventors: Egon Schulz, München (DE); Wolfgang Zirwas, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 356 days.

(21) Appl. No.: 11/920,975

(22) PCT Filed: Nov. 2, 2005

(86) PCT No.: PCT/EP2005/055715
§ 371 (c)(1),
(2), (4) Date: Feb. 26, 2009

(87) PCT Pub. No.: WO2006/125476
PCT Pub. Date: Nov. 30, 2006

(65) Prior Publication Data
US 2009/0285321 A1    Nov. 19, 2009

(30) Foreign Application Priority Data
May 25, 2005  (EP) ..................................... 05011390

(51) Int. Cl.
H04B 7/02  (2006.01)
(52) U.S. Cl. ........ 375/267; 375/260; 375/259; 375/219; 375/220
(58) Field of Classification Search ............. 375/267, 375/259, 260, 219, 220
See application file for complete search history.

(56) References Cited

U.S. PATENT DOCUMENTS

| | | | |
|---|---|---|---|
| 6,801,770 B2 * | 10/2004 | Rinne et al. .................... | 455/434 |
| 2004/0082356 A1 * | 4/2004 | Walton et al. .................. | 455/522 |
| 2004/0125742 A1 * | 7/2004 | Schmidt ......................... | 370/208 |
| 2005/0036563 A1 * | 2/2005 | Suzuki et al. .................. | 375/260 |
| 2005/0073971 A1 * | 4/2005 | Mukai ............................ | 370/328 |
| 2005/0129136 A1 * | 6/2005 | Fujii et al. ..................... | 375/260 |
| 2005/0281292 A1 * | 12/2005 | Troulis et al. .................. | 370/516 |
| 2006/0013325 A1 * | 1/2006 | Agrawal et al. ................ | 375/260 |
| 2006/0239364 A1 * | 10/2006 | Wilhelmsson ................. | 375/260 |

FOREIGN PATENT DOCUMENTS
DE   102 13 872 A1   10/2003
EP   0 938 193 A1    8/1999

OTHER PUBLICATIONS
International Search Report for Application No. PCT/EP2005/055715; mailed Feb. 3, 2006.

* cited by examiner

Primary Examiner — Shuwang Liu
Assistant Examiner — Kenneth Lam
(74) Attorney, Agent, or Firm — Staas & Halsey LLP

(57) ABSTRACT

Information, in particular OFDM-symbols, is transmitted via radio from an emitting unit to a receiving unit. At least one first symbol has a first total length, which includes a first time section during which first user data is transmitted and a second time section during which cyclic repetitions of the first user data are transmitted. Also, at least one second symbol has the first total length which includes a third time section, having a length different than the first time section, during which second user data is transmitted, and a fourth time section, having a length different than the second time section, during which cyclic repetitions of the second user data is transmitted.

13 Claims, 2 Drawing Sheets

RADIO TRANSMISSION WITH VARIABLE LENGTH OF GUARD INTERVAL

CROSS REFERENCE TO RELATED APPLICATIONS

This application is based on and hereby claims priority to European Application No. 05011390 filed on May 25, 2005, the contents of which are hereby incorporated by reference.

BACKGROUND

Described below are methods for transmitting information by radio from a transmitter to a receiver, in which symbols of a first total length are transmitted in a first time period with first useful data and in a second time period with cyclic repetitions of the first useful data.

In radio communication systems, messages, for example containing voice information, image information, video information, SMS (Short Message Service), MMS (Multimedia Messaging Service) or other data, are transmitted between the transmitter and the receiver via a radio interface using electromagnetic waves. In this context, the radio stations may be various kinds of subscriber stations or network radio devices, such as repeaters, radio access points or base stations, depending on the specific refinement of the radio communication system. In a mobile radio communication system, at least some of the subscriber stations are mobile radio stations. The electromagnetic waves are emitted at carrier frequencies which are in the frequency band provided for the respective system.

Mobile radio communication systems are often in the form of cellular systems, e.g. based on the GSM (Global System for Mobile Communication) or UMTS (Universal Mobile Telecommunications System) standard, with a network infrastructure including, by way of example, base stations, devices for inspecting and controlling the base stations and other network devices. Apart from these extensively organized (supralocal) cellular, hierarchic radio networks, there are also wireless local area networks (WLANs) with a radio coverage area which is normally much more limited in physical terms. Examples of different standards for WLANs are HiperLAN, DECT, IEEE 802.11, Bluetooth and WATM.

Access by subscriber stations to the common transmission medium is regulated in radio communication systems by multiple access (MA) methods/multiplex methods. For this multiple access, the transmission medium can be split in the time domain (Time Division Multiple Access, TDMA), in the frequency domain (Frequency Division Multiple Access, FDMA), in the code domain (Code Division Multiple Access, CDMA) or in the space domain (Space Division Multiple Access, SDMA) between the subscriber stations. Combinations of multiple access methods are also possible, such as combining a frequency division multiple access method with a code division multiple access method.

To achieve the most efficient transmission of data possible, the entire available frequency band is broken down into a plurality of subcarriers (multicarrier method). The idea on which the multicarrier systems are based is to convert the initial problem of transmitting a wide band signal into transmitting a plurality of narrowband signals. This has the advantage, inter alia, that the complexity required on the receiver can be reduced. In addition, splitting the available bandwidth into a plurality of narrowband subcarriers allows a significantly higher level of granularity for data transmission in terms of distribution of the data which is to be transmitted over the different subcarriers, i.e. the radio resources can be distributed over the data which is to be transmitted or over the subscriber stations with a high degree of fineness. Particularly in the case of transmissions at a variable data rate or in the case of bursty data traffic, the available bandwidth can be put to efficient use by assigning a number of subcarriers to different subscriber stations.

An example of a multicarrier transmission method is OFDM (Orthogonal Frequency Division Multiplexing), in which pulse shapes which are approximately square over time are used for the subcarriers. The frequency spacing for the subcarriers is chosen such that at that frequency in the frequency domain at which the signal from a subcarrier is evaluated the signals from the other subcarriers have a zero crossing. The subcarriers are therefore orthogonal with respect to one another. The usually very small spacing between the subcarriers and the narrowband nature of the signals transmitted on the individual subcarriers in the case of OFDM are intended to ensure that the transmission within the individual subcarriers is generally not frequency selective. This simplifies the signal equalization on the receiver.

SUMMARY

An aspect is providing efficient methods for communication by radio. In addition, suitable apparatuses for carrying out the methods will be presented.

In the method described below for transmitting information by radio from a transmitter to a receiver, at least one first symbol of a first total length is transmitted during a first time period with first useful data and a second time period with cyclic repetitions of the first useful data. In addition, at least one second symbol of the first total length is transmitted during a third time period, of a different length than the first time period, with second useful data and a fourth time period, of a different length than the second time period, with cyclic repetitions of the second useful data.

Advantageously, the transmitter is a network device in a radio communication system and the receiver is a mobile or fixed subscriber station in the system, or vice versa. The transmission can be both in the uplink and in the downlink directions.

Symbols are transmitted during at least two time periods in the time domain: a time period with useful data and a time period with cyclic repetitions of the useful data. It is possible for the symbols to have further time periods, but advantageously the symbols are exclusively transmitted during the two time periods cited. In this case, the total length of a symbol is obtained as the sum of the lengths of the two time periods cited.

At least one first symbol and at least one second symbol are transmitted from the transmitter to the receiver. The two symbols are preferably transmitted in succession, but simultaneous transmission is also possible. The two symbols have the same total length, with both the two lengths of the time periods for useful data and the two lengths of the time periods for the cyclic repetitions respectively differing from one another. The total length of the first and of the second symbol does not need to be exactly the same. It is thus possible for the total length of the first symbol to differ from the total length of the second symbol within a tolerance range.

The second and fourth time periods can be used to avoid intersymbol interference, i.e. to avoid interference between symbols which are sent at successive times. This interference arises as a result of different multipath propagation times on the radio channel. To avoid intercarrier interference, i.e. interference between adjacent subcarriers, the guard interval introduced to avoid intersymbol interference, i.e. the second and fourth time periods, is filled with cyclic additions.

In one development, a change from transmission of the at least one first symbol to transmission of the at least one second symbol is made on the basis of at least one property of the transmission channel between the transmitter and the receiver and/or on the basis of a transmission quality. Thus, by way of example, the current channel impulse response and/or the current and/or a desired signal-to-noise ratio can be included in the decision about the change between the symbols of various designs. The decision about the change is preferably made on the network and signaled to the relevant subscriber station.

In a second method described below for transmitting information between a network radio device and subscriber stations in a radio communication system, at least one first symbol of a first total length, is transmitted during a first time period with first useful data and a second time period with cyclic repetitions of the first useful data, between the network radio device and a first subscriber station. In addition, at least one second symbol of the first total length, is transmitted during a third time period, of a different length than the first time period, with second useful data and a fourth time period, of a different length than the second time period, with cyclic repetitions of the second useful data, between the network radio device and a second subscriber station.

Symbols are transmitted during at least two time periods in the time domain: a time period with useful data and a time period with cyclic repetitions of the useful data. It is possible for the symbols to have further time periods, but advantageously the symbols are exclusively transmitted during the two time periods cited. In this case, the total length of a symbol is obtained as the sum of the lengths of the two time periods cited.

The communication between the network radio device and the first subscriber station can take place both in the uplink and in the downlink. Similarly, the communication between the network radio device and the second subscriber station can take place both in the uplink and in the downlink, regardless of the direction of the communication between the network radio device and the first subscriber station. The at least one first symbol and the at least one second symbol can be transmitted simultaneously or in succession between the network radio device and the subscriber stations. The two symbols have the same total length, with both the two lengths of the time periods for useful data and the two lengths of the time periods for the cyclic repetitions respectively differing from one another. The total length of the first and of the second symbol does not need to be exactly the same. It is thus possible for the total length of the first symbol to differ from the total length of the second symbol within a tolerance range.

The network radio device is a network device in a radio communication system. The first and second subscriber stations, with which it communicates, may be mobile or fixed radio stations.

The second and fourth time periods can be used to avoid intersymbol interference, i.e. to avoid interference between symbols sent at successive times. This interference arises on account of different multipath propagation times on the radio channel. To avoid intercarrier interference, i.e.

interference between adjacent subcarriers, the guard interval introduced to avoid intersymbol interference, i.e. the second and fourth time periods, is filled with cyclic additions.

In one development, the network radio device sends the first subscriber station information about the lengths of the first and/or the second time period and sends the second subscriber station information about the lengths of the third and/or the fourth time period. This information can explicitly specify the respective lengths. Alternatively, it is possible for the information to allow the subscriber stations to ascertain the respective lengths. Advantageously, the network radio device or a network device connected thereto decides upon the lengths to be used for the time periods, e.g. on the basis of a property of a transmission channel between the network radio device and the respective subscriber station and/or on the basis of a transmission quality.

It is particularly advantageous if OFDM symbols are transmitted on a plurality of subcarriers from a frequency band and the first and second symbols are OFDM symbols.

In accordance with one advantageous refinement, the sampling rate of the useful data from the third time period differs from the sampling rate of the useful data from the first time period while the symbols are being processed by the transmitter and/or receiver, the number of samples of the useful data from the third time period being equal to the number of samples of the useful data from the first time period. The number of samples of the useful data is the same despite the first and the third time period being of different duration, since different sampling rates are used for the first and third time periods.

It is advantageous if the number of subcarriers used for transmitting the at least one first symbol is different than the number of subcarriers used for transmitting the at least one second symbol. In addition, the width of the individual subcarriers used for transmitting the at least one first symbol may differ from the width of the individual subcarriers used for transmitting the at least one second symbol.

It is possible for the width of the frequency band used for transmitting the at least one first symbol to be equal to the width of the frequency band used for transmitting the at least one second symbol. Alternatively, the width of the frequency band used for transmitting the at least one first symbol may be different than the width of the frequency band used for transmitting the at least one second symbol.

In one refinement, the magnitude of the Fourier transformation or inverse Fourier transformation used by the transmitter and/or receiver when processing the at least one first symbol is the same as when processing the at least one second symbol. This refinement allows the methods to be implemented in uncomplex fashion with regard to the hardware of the transmitter and the receiver.

The transmitter sends information by radio to a receiver by creating and sending at least one first symbol of a first total length, during a first time period with first useful data and a second time period with cyclic repetitions of the first useful data, and by creating and sending at least one second symbol of the first total length, during a third time period, of a different length than the first time period, with second useful data and a fourth time period, of a different length than the second time period, with cyclic repetitions of the second useful data.

The receiver receives information by radio from a transmitter by receiving and processing at least one first symbol of a first total length, during a first time period with first useful data and a second time period with cyclic repetitions of the first useful data, and by receiving and processing at least one second symbol of the first total length, during a third time period, of a different length than the first time period, with second useful data and a fourth time period, of a different length than the second time period, with cyclic repetitions of the second useful data.

The network device in a radio communication system sends information to subscriber stations and for receiving information from subscriber stations by sending and/or receiving at least one first symbol of a first total length, during a first time period with first useful data and a second time period with cyclic repetitions of the first useful data, to and, in the case of transmission in the uplink, from a first subscriber station, and sends and/or receives at least one second symbol of the first total length, during a third time period, of a different length than the first time period, with second useful data and a fourth time period, of a different length than the second time period, with cyclic repetitions of the second useful data, to and, in the case of transmission in the uplink, from a second subscriber station.

The transmitter, the receiver and the network device are suitable particularly for carrying out the methods described below, this also being able to apply to the refinements and developments. To this end, they can have further suitable ways for sending and/or receiving symbols on a plurality of subcarriers from a frequency band.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
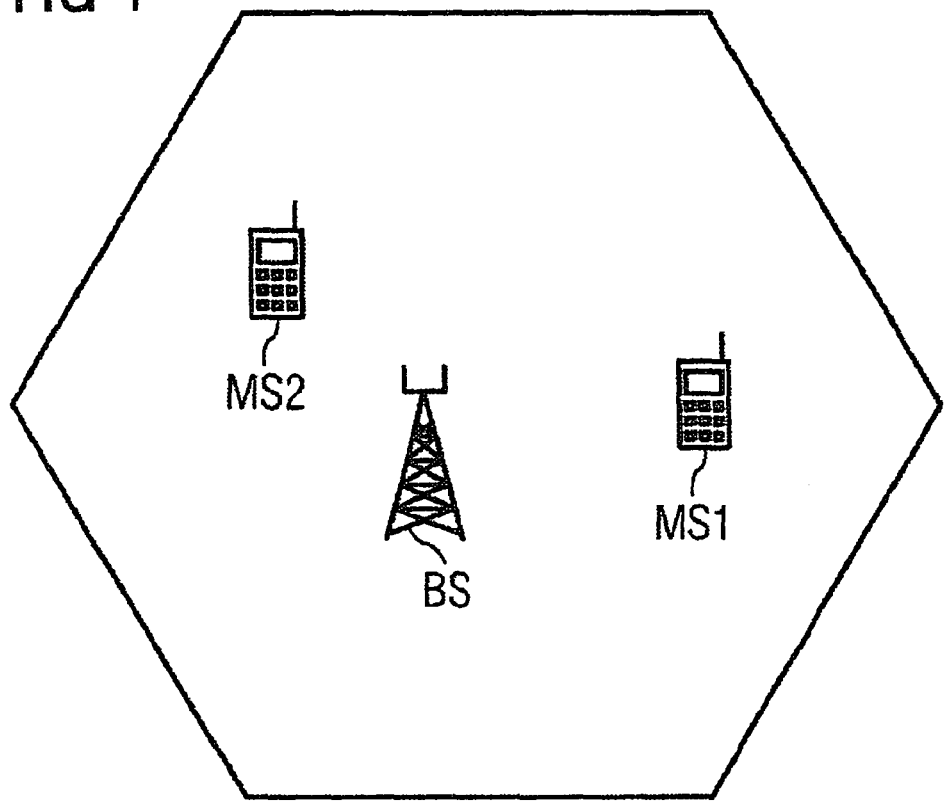
FIG. 1 is a representational diagram of components in a radio communication system.

Reference will now be made in detail to the preferred embodiments, examples of which are illustrated in the accompanying drawings, wherein like reference numerals refer to like elements throughout.

FIG. 1 shows the radio coverage area of a base station BS, shown as a hexagon. The base station BS may be a network device in an extensive or a local radio communication system. The radio coverage area of the base station BS contains the subscriber stations MS1 and MS2. The subscriber stations MS1 and MS2 may be mobile or fixed radio stations, such as telephones or computers. The communication between the base station BS and the subscriber stations MS1 and MS2 can take place both in the uplink and in the downlink. The procedure described below can be applied both in the uplink and in the downlink directions.

The communication between the base station BS and the subscriber stations MS1 and MS2 takes place using OFDM. To this end, a wide frequency band is used which is divided into a plurality of subcarriers. A subscriber station MS1 or MS2 may be assigned one, a plurality or all of the subcarriers from the available frequency band for the purpose of communication. To avoid intersymbol interference between chronologically adjacent OFDM symbols, a guard interval with cyclic continuation is used. The use of guard intervals in OFDM is described by way of example in: V. Engels, H. Rohling, S. Breide: "OFDM Übertragungsverfahren für den Digitalen Fernsehrundfunk" [OFDM transmission methods for digital television broadcasting], special edition from Rundfunktechnische Mitteilungen, volume 37 (1993), No 6, pages 260-270, Brunswick Technical University.

Figure 2:
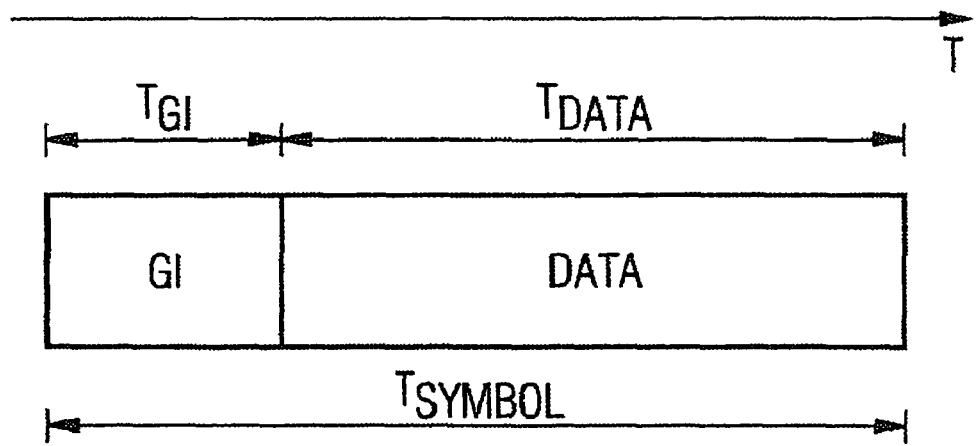
FIG. 2 is a data structure diagram of an OFDM symbol in the time domain, and FIG. 3 are data structure diagrams of OFDM symbols in the time domain and in the frequency domain.

FIG. 2 shows the structure of an OFDM symbol of length $T_{SYMBOL}$ in the time domain T. The guard interval GI, which may be at the start or at the end of the OFDM symbol, has the length $T_{GI}$. The useful data section DATA has the length $T_{DATA}$. The following relationship applies: $T_{SYMBOL}=T_{GI}+T_{DATA}$. The useful data generally include a plurality of samples, while the guard interval GI contains repetitions of these samples.

Intersymbol interference arises on account of multipath transmission over the radio channel between the transmitter and the receiver. The length of the guard interval GI should therefore be chosen such that it is longer than the longest multipath component of the radio channel. The delay (delay spread) as a result of multipath transmission can range from 100 ns for indoor transmissions up to several μs for outdoor transmissions. A large guard interval GI should therefore be used for outdoor transmissions, whereas a short guard interval GI is adequate for indoor transmissions. If the guard interval GI is chosen to be too short, on the one hand, the transmission quality can fall. On the other hand, a long guard interval GI corresponds to transmission of redundant information to a large extent, which reduces the useful data rate.

Figure 3:
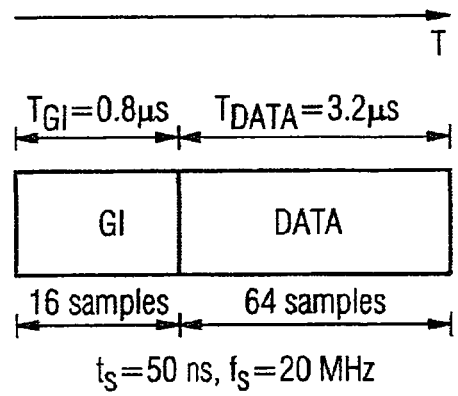
Figure 3:
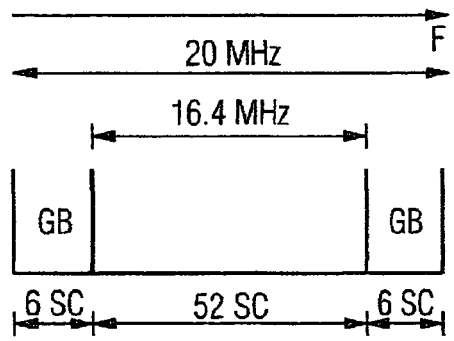
Figure 3:
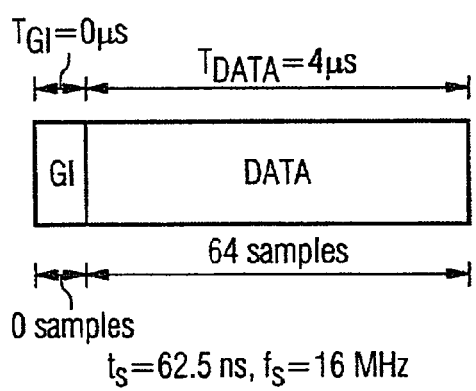
Figure 3:
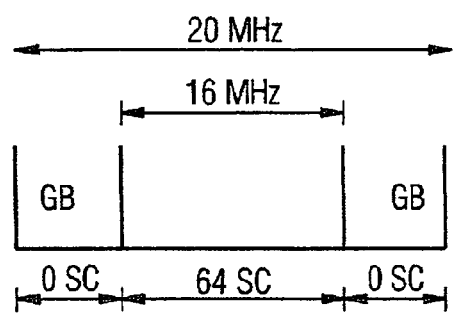
Figure 3:
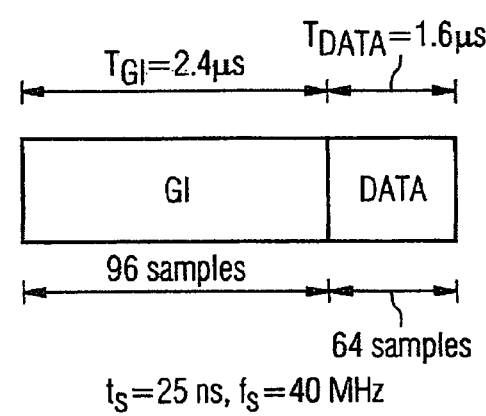
Figure 3:
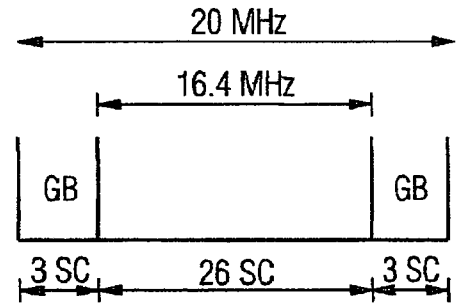

The left-hand half of FIG. 3 shows the structure of OFDM symbols in the time domain T, and the right-hand half shows the structure of OFDM symbols in the frequency domain F. According to the section of illustration at the top, the guard interval GI has a length $T_{GI}$ of 0.8 μs, and the useful data section DATA has a length $T_{DATA}$ of 3.2 μs. The total symbol period is therefore 0.8 μs+3.2 μs=4.0 μs. The guard interval GI contains 16 samples and the useful data section DATA contains 64 samples, with a sample corresponding to an individual symbol. A sampling frequency $f_s$ of 20 MHz is used, or a sampling period $t_s$ of 50 ns. The number of samples is obtained from $$\frac{3.2 \text{ μs}}{50 \text{ ns}} = 64.$$

In line with the right-hand half of the top section of illustration, a bandwidth of 20 MHz is available for the communication under consideration. The bandwidth of 20 MHz is divided into 64 subcarriers SC. The FFT (Fast Fourier Transform) and IFFT (Inverse Fast Fourier Transform) to be performed by the transmitter and receiver in the case of OFDM means that the number of subcarriers SC corresponds to the number of samples of the useful data section DATA. 16.4 MHz are used for transmitting information, corresponding to 52 subcarriers SC. In this context, 48 subcarriers SC are used for the useful data and 4 subcarriers SC are used for pilot signals. The remaining subcarriers SC, i.e. 6 respective subcarriers SC on the two sides of the 52 subcarriers SC, are not used to transmit any information. This bandwidth involves guard bands GB. These are used to prevent the information transmitted within the bandwidth of 20 MHz from interfering with the information transmitted on other frequencies.

In line with the methods described herein, the duration of the guard interval GI is varied, with the total symbol period remaining constant. The middle section of illustration in FIG. 3 shows the extreme case in which the period $T_{GI}$ of the guard interval GI is 0 μs, while the period $T_{DATA}$ of the useful data section DATA corresponds to the total symbol period of 4 μs. In order to keep the number of samples in the useful data section DATA constant at 64 samples despite the altered period $T_{DATA}$ of the useful data section DATA, the sampling frequency $f_s$ is reduced to 16 MHz or the sampling period $t_s$ increased to 62.5 ns.

Since the duration of the useful data section DATA in the case of OFDM is inversely proportional to the width of the subcarriers SC, the increase in the period $T_{DATA}$ of the useful data section DATA results in a reduction in the width of the subcarriers SC. Therefore, the 64 subcarriers SC, which are used on the basis of the 64 samples of the useful data section DATA, require a bandwidth of just 16 MHz. Since the connection has 20 MHz available, there are respectively 2 MHz on both sides of the 16 MHz, the 2 MHz forming guard bands GB. Hence, in line with the middle illustration in FIG. 3, 64 subcarriers SC are used for transmitting information, of which 60 subcarriers SC are used for the useful data and 4 subcarriers SC are used for pilot signals. The remaining bandwidth, i.e. two times 2 MHz, is not divided into subcarriers SC, which means that the guard bands GB each include zero subcarriers.

The bottom section of illustration in FIG. 3 shows the case in which the length $T_{GI}$ of the guard interval GI is increased in comparison with the top section of illustration. It is 2.4 µs, whereas the period $T_{DATA}$ of the useful data section DATA is just 1.6 µs. To ensure that the useful data section DATA includes 64 samples, the sampling frequency $f_s$ is increased to 40 MHz, or the sampling period $t_s$ is reduced to 25 ns. Shortening the period $T_{DATA}$ of the useful data section DATA increases the frequency width of the subcarriers SC, so that the total width of 64 subcarriers SC is 40 MHz. For the purpose of transmitting information, 26 subcarriers SC are used, corresponding to a total frequency width of 16.4 MHz. In this case, 22 subcarriers SC are used for the useful data and 4 subcarriers SC are used for pilot signals. In addition, 3 respective subcarriers SC on both sides of the 26 subcarriers SC are not used for transmitting information but rather are used as guard bands. There are therefore a further 32 subcarriers SC which project beyond the 20 MHz range and are therefore not used.

The procedure explained by way of example with reference to FIG. 3 can be summarized as follows: the length of the guard interval is varied. Since this variation occurs at constant total symbol length, the length of the useful data section also varies. The magnitude of the Fourier transformation or inverse Fourier transformation to be performed by the receiver and transmitter is the same for all lengths of the guard interval GI. This is achieved by altering the sampling frequency, so that the number of samples of the useful data section is constant in the time domain. The reciprocity between the length of the useful data section and the width of the subcarriers means that the width of the subcarriers varies as the length of the guard interval varies. This means that at a given bandwidth for a connection, 20 MHz in 3, the total width of the subcarriers for the connection may be less than or greater than the given bandwidth. In the second case, some of the subcarriers therefore cannot be used for the connection. Whereas the data rate is therefore adapted in the time domain by altering the length of the useful data section, the data rate is adapted in the frequency domain by using a different number of subcarriers for the transmission.

The three sections of illustration in FIG. 3 can relate to a particular connection between a base station and a subscriber station, with the OFDM symbols being structured in line with the top section of illustration at a first time, in line with the middle section of illustration at a second time and in line with the bottom section of illustration at a third time. The length of the guard interval therefore varies with time. It is also possible for the top section of illustration to correspond to a connection between a base station and a first subscriber station, for the middle section of illustration to correspond to a connection between the base station and a second subscriber station, and for the bottom section of illustration to correspond to a connection between the base station and a third subscriber station. In this case, the length of the guard interval varies with the connection. Additional variation with time for the individual connections is possible.

The length of the guard interval is preferably varied on the basis of the channel impulse response and/or on the basis of the desired or the current signal-to-noise ratio of the respective connection. It is therefore appropriate to use a long guard interval for long delays on account of multipath propagation or when signal-to-noise ratios are desired to be high and are currently low. The channel impulse response of the transmission channel between the transmitter and receiver is determined by the receiver. If the receiver is a subscriber station, the subscriber station informs the base station about the channel impulse response it has ascertained. The same also applies in relation to the current signal-to-noise ratio. The length of guard interval to be used or another variable from which the length of the guard interval is obtained, such as the sampling frequency, is determined by the base station or by another network device and is signaled to the subscriber station. Since the properties of the transmission channel normally alter slowly, such signaling is not required often, which means that the signaling overhead produced as a result is not high.

The practice described has the advantage that the constant total symbol length means that the time frame structure is retained. This simplifies the synchronization between the transmitter and the receiver and is advantageous particularly for TDMA methods. By adjusting the sampling frequency to suit the length of the useful data section, it is possible for Fourier transformation to need to be able to be performed only on a single variable. This reduces the complexity of the transmitter and receiver ends.

For the sampling frequency, a maximum value and a minimum value are preferably prescribed, such as 16 MHz and 40 MHz in FIG. 3, the sampling frequencies used needing to be between the maximum value and a minimum value. In addition, it should not be the case that any values between the maximum value and a minimum value are used for the sampling frequency, but rather an integer number of samples per total symbol is intended to be obtained for a given total symbol length.

This allows flexible adjustment of the composition of an OFDM symbol on the basis of the current radio transmission conditions and/or on the basis of the desired transmission quality. This adjustment can be made during the connection by virtue of the base station signaling the parameters which are to be used for OFDM processing to the respective subscriber station. For connections to different subscriber stations, the base station can use different splits for the OFDM symbols. In this context, the base station and the various subscriber stations can communicate successively on the basis of a TDMA mode of operation and/or simultaneously on the basis of an FDMA mode of operation.

While the methods have been explained on the basis of OFDM communication, it is not limited to OFDM communication systems. Rather, the symbols with the variable guard interval can also be transmitted on one subcarrier instead of a plurality of subcarriers.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Super guide v. DIRECTV*, 358 F3d 870, 69 USPQ2d 1865 (Fed. Cir. 2004).

The invention claimed is:

1. A method for transmitting information by radio from a transmitter to a receiver, comprising:

transmitting at least one first symbol of a first total length, including first useful data during a first time period and cyclic repetitions of the first useful data during a second time period;

transmitting at least one second symbol of the first total length, including second useful data during a third time period, having a first length different than the first time period, and cyclic repetitions of the second useful data during a fourth time period, having a second length different than the second time period; and processing of the at least one first and at least one second symbols by at least one of the transmitter and the receiver at a first sampling rate of the first useful data transmitted during the first time period different from a second sampling rate of the second useful data transmitted during the third time period, where a number of samples of the first useful data transmitted during the first time period is equal to the number of the samples of the second useful data transmitted during the third time period.

2. The method as claimed in claim 1, further comprising changing from transmission of the at least one first symbol to transmission of the at least one second symbol based on at least one of transmission quality and at least one property of a transmission channel between the transmitter and the receiver.

3. The method as claimed in claim 1, wherein said processing by the at least one of the transmitter and receiver includes performing a Fourier transformation on the at least one first symbol and the at least one second symbol with a same magnitude for both the at least one first symbol and the at least one second symbol.

4. A method for transmitting information between a network radio device and subscriber stations in a radio communication system, comprising:

transmitting, between the network radio device and a first subscriber station, at least one first symbol of a first total length, including first useful data during a first time period and cyclic repetitions of the first useful data during a second time period;

transmitting, between the network radio device and a second subscriber station, at least one second symbol of the first total length, including second useful data during a third time period a first length different than the first time period, and cyclic repetitions of the second useful data during a fourth time period having a second length different than the second time period; and processing of the at least one first and at least one second symbols by the network radio device at a first sampling rate of the first useful data transmitted during the first time period different from a second sampling rate of the second useful data transmitted during the third time period, where a number of samples of the first useful data transmitted during the first time period is equal to the number of the samples of the second useful data transmitted during the third time period.

5. The method as claimed in claim 4, further comprising:

sending from the network device to the first subscriber station information about at least a third length of at least one of the first and second time periods; and sending from the network device to the second subscriber station information about at least one of the first and second lengths of at least one of the third and fourth time periods, respectively.

6. The method as claimed in claim 5, wherein Orthogonal Frequency Division Multiplexing symbols are transmitted on subcarriers of a frequency band, and wherein the first and second symbols are Orthogonal Frequency Division Multiplexing symbols.

7. The method as claimed in claim 6, wherein a first number of first subcarriers used for transmitting the at least one first symbol is different than a second number of second subcarriers used for transmitting the at least one second symbol.

8. The method as claimed in claim 7, wherein a first width of a first subcarrier used for said transmitting of the at least one first symbol is different than a second width of second subcarriers used for transmitting the at least one second symbol.

9. The method as claimed in claim 8, wherein a width of the frequency band used for transmitting the at least one first symbol is equal to the width of the frequency band used for transmitting the at least one second symbol.

10. The method as claimed in claim 8, wherein a first width of a first frequency band used for transmitting the at least one first symbol is different than a second width of a second frequency band used for transmitting the at least one second symbol.

11. A transmitter for sending information by radio to a receiver, comprising:

means for creating and sending at least one first symbol having a total length, including sending first useful data during a first time period and sending cyclic repetitions of the first useful data during a second time period;

means for creating and sending at least one second symbol having the total length, including second useful data during a third time period having a first length different than the first time period, and cyclic repetitions of the second useful data during a fourth time period having a second length different than the second time period; and means for processing of the at least one first and at least one second symbols at a first sampling rate of the first useful data transmitted during the first time period different from a second sampling rate of the second useful data transmitted during the third time period, where a number of samples of the first useful data transmitted during the first time period is equal to the number of the samples of the second useful data transmitted during the third time period.

12. A receiver for receiving information by radio from a transmitter, comprising:

means for receiving and processing at least one first symbol having a total length, including sending first useful data during a first time period and sending cyclic repetitions of the first useful data during a second time period;

means for receiving and processing at least one second symbol having the total length, including second useful data during a third time period having a first length different than the first time period, and cyclic repetitions of the second useful data during a fourth time period having a second length different than the second time period; and means for processing of the at least one first and at least one second symbols at a first sampling rate of the first useful data transmitted during the first time period different from a second sampling rate of the second useful data transmitted during the third time period, where a number of samples of the first useful data transmitted during the first time period is equal to the number of the samples of the second useful data transmitted during the third time period.

13. A network device in a radio communication system for sending information to subscriber stations and for receiving information from subscriber stations, comprising:
  means for at least one of sending and receiving, to and from a first subscriber station, at least one first symbol having a total length, including first useful data during a first time period and cyclic repetitions of the first useful data during a second time period;
  means for at least one of sending and receiving, to and from a second subscriber station, at least one second symbol of the total length, including second useful data during a third time period having a first length different than the first time period, and cyclic repetitions of the second useful data during a fourth time period having a second length different than the second time period; and
  means for processing of the at least one first and at least one second symbols at a first sampling rate of the first useful data transmitted during the first time period different from a second sampling rate of the second useful data transmitted during the third time period, where a number of samples of the first useful data transmitted during the first time period is equal to the number of the samples of the second useful data transmitted during the third time period.

* * * * *